US010419345B2

United States Patent
Mosko et al.

(10) Patent No.: US 10,419,345 B2
(45) Date of Patent: *Sep. 17, 2019

(54) NETWORK NAMED FRAGMENTS IN A CONTENT CENTRIC NETWORK

(71) Applicant: Cisco Technology, Inc., San Jose, CA (US)

(72) Inventors: Marc E. Mosko, Santa Cruz, CA (US); Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,893

(22) Filed: Oct. 23, 2017

(65) Prior Publication Data

US 2018/0048570 A1    Feb. 15, 2018

Related U.S. Application Data

(63) Continuation of application No. 14/851,894, filed on Sep. 11, 2015, now Pat. No. 9,832,123.

(51) Int. Cl.
*H04L 12/743* (2013.01)
*H04L 12/725* (2013.01)
(Continued)

(52) U.S. Cl.
CPC ............ *H04L 45/7453* (2013.01); *H04L 9/00* (2013.01); *H04L 9/3247* (2013.01);
(Continued)

(58) Field of Classification Search
CPC ..... H04L 45/7453; H04L 9/00; H04L 9/3247; H04L 45/306; H04L 63/04; H04L 63/12
(Continued)

(56) References Cited

U.S. PATENT DOCUMENTS 817,441 A    4/1906 Niesz
4,309,569 A    1/1982 Merkle
(Continued)

FOREIGN PATENT DOCUMENTS

CN    103873371    6/2014
DE    1720277 A1    6/1967
(Continued)

OTHER PUBLICATIONS

Extended European Search Report in counterpart European Application No. 16186454.1, dated Jan. 23, 2017, 5 pages.
(Continued)

*Primary Examiner* — Sai Ming Chan
(74) *Attorney, Agent, or Firm* — Edell, Shapiro & Finnan, LLC

(57) ABSTRACT

A system facilitates efficient and secure transportation of content. An intermediate node receives a packet that corresponds to a fragment of a content object message that is fragmented into a plurality of fragments. One or more fragments of the plurality of fragments indicate a unique name that is a hierarchically structured variable-length identifier that comprises contiguous name components ordered from a most general level to a most specific level. The received fragment indicates an intermediate state which is based on a hash function performed on an intermediate state from a previous fragment and data included in the received fragment. In response to determining that the received fragment is a first fragment, the system identifies a first entry in a pending interest table for an interest with a name that is based on a hash of a content object and that corresponds to the first fragment.

20 Claims, 14 Drawing Sheets

(51) Int. Cl.
*H04L 29/06* (2006.01)
*H04L 9/00* (2006.01)
*H04L 9/32* (2006.01)

(52) U.S. Cl.
CPC ............ *H04L 45/306* (2013.01); *H04L 63/04* (2013.01); *H04L 63/12* (2013.01); *H04L 2209/38* (2013.01); *H04L 2209/60* (2013.01)

(58) Field of Classification Search
USPC ...................................................... 370/392
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B1 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |

(56) References Cited

U.S. PATENT DOCUMENTS

| | | |
|---|---|---|
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0255947 A1* | 11/2007 | Choudhury ........... H04L 9/0637 713/161 |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |

(56) References Cited

U.S. PATENT DOCUMENTS

| | | |
|---|---|---|
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0015599 A1 | 1/2009 | Bennett et al. |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson ............ H04L 45/00 370/392 |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0013746 A1* | 1/2012 | Chen .................... G11B 27/034 348/180 |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |

(56) References Cited

U.S. PATENT DOCUMENTS

| | | |
|---|---|---|
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |

(56) References Cited

U.S. PATENT DOCUMENTS

| | | | |
|---|---|---|---|
| 2016/0021172 A1 | 1/2016 | Mahadevan | |
| 2016/0062840 A1 | 3/2016 | Scott | |
| 2016/0110466 A1 | 4/2016 | Uzun | |
| 2016/0162691 A1* | 6/2016 | Arnold | G06F 21/60 726/26 |
| 2016/0171184 A1 | 6/2016 | Solis | |
| 2016/0182192 A1* | 6/2016 | Milbar | H04L 1/08 714/748 |
| 2017/0078185 A1* | 3/2017 | Yao | H04L 29/06 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Ghali, et al., "Secure Fragmentation for Content-Centric Networks," arXiv:1405.2861v3, Aug. 19, 2015, 30 pages.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 * The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

Mind—A Brief Introduction, John R. Searle, 2004, Oxford University Press, pp. 62-67.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library—Pairing-Based Cryptography—About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

(56) References Cited

OTHER PUBLICATIONS

Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management, Jun. 2004.
J. Shao and Z. Cao. CCA-Secure Proxy Re-Encryption without Pairings. Public Key Cryptography. Springer Lecture Notes in Computer Sciencevol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

(56) References Cited

OTHER PUBLICATIONS

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/screenshot-2019-6-19 Google Code Archive—Long term storage for Google Code Project Hosting.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

Koponen, Teemu et al., "A Data-Oriented (and Beyond) Network Architecture", SIGCOMM '07, Aug. 27-31, 2007, Kyoto, Japan, XP-002579021, p. 181-192.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

(56) References Cited

OTHER PUBLICATIONS

S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.

\* cited by examiner

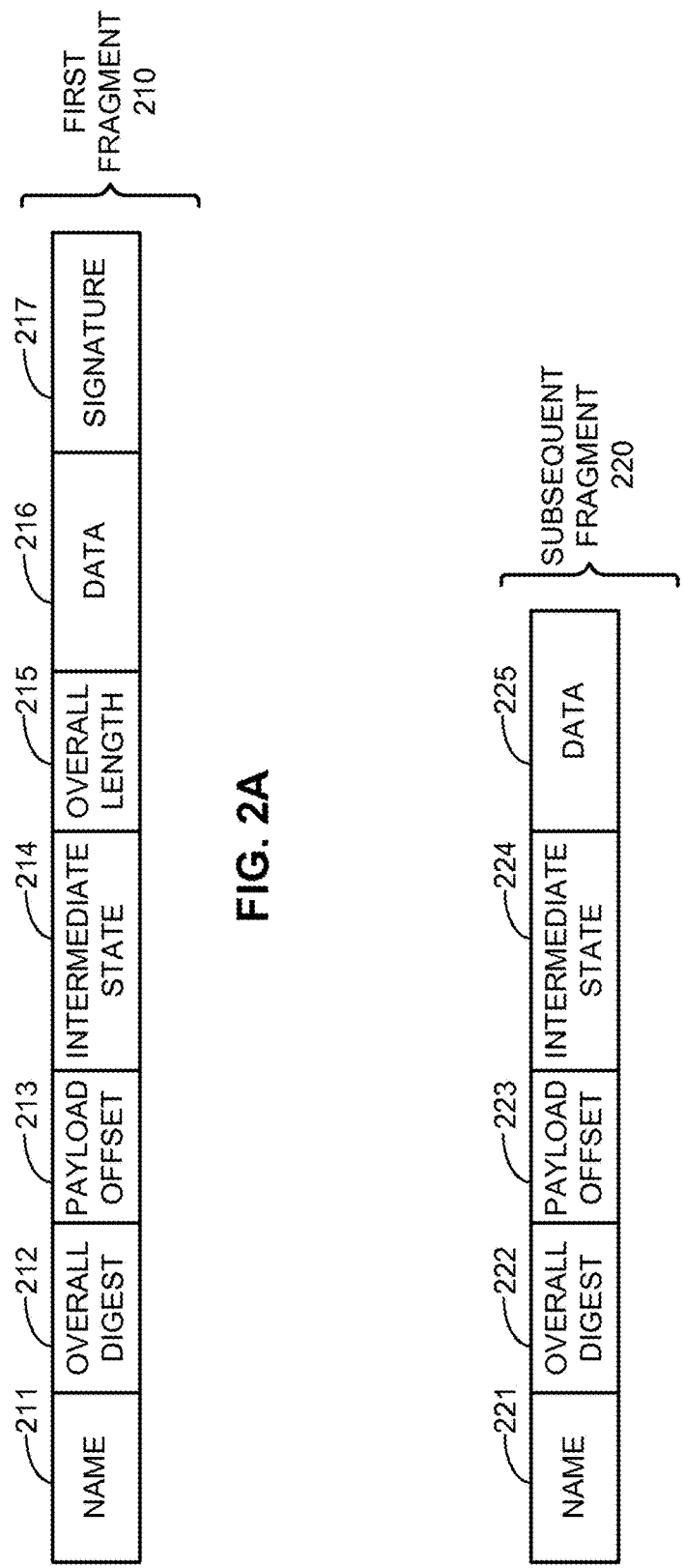

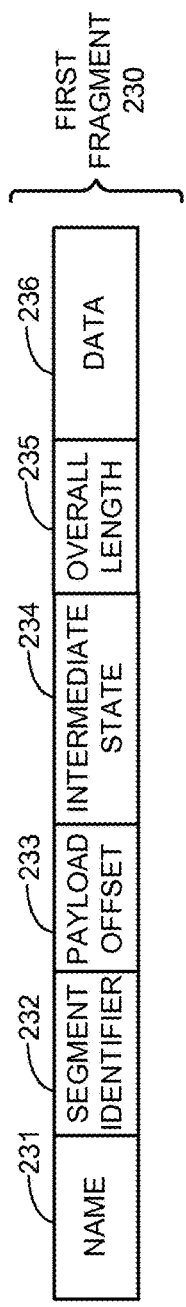
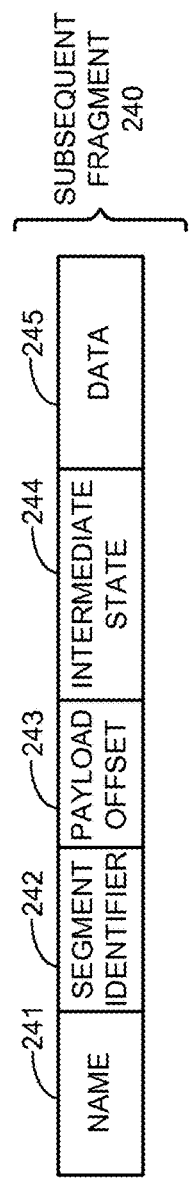
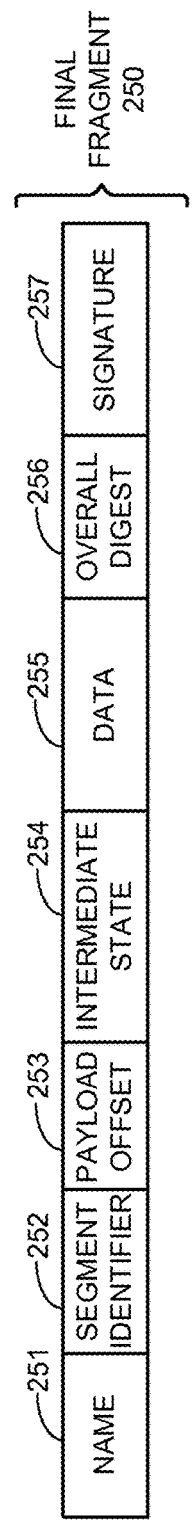
FIG. 2C
FIG. 2D
FIG. 2E

TABLE 670

Algorithm 1 Fragment Logic
1: Input: Content fragment with {Name, OverallDigest, Payload-Offset, IntermediateState (IS)}
2: if Buffer[OverallDigest] does not exist then
3:   Create with nextInterState = SHA256 Initialization value.
4: end if
5: Compute IS' = h(IS, payload).
6: if Previous fragment with (PayloadEnd + 1) = current PayloadOffset nor next fragment (with PayloadOffset = PayloadEnd + 1) is in Buffer. then
7:   Store the packet.
8: else if Previous fragment is in Buffer, but next fragment is not then
9:   Verify that previous fragment IS' = IS, otherwise drop.
10: else if Next fragment is in Buffer, but the previous is not then
11:   Verify that IS' = next fragment's IS, otherwise drop.
12: else if Both previous and next are in Buffer then
13:   Verify that the hash chain is continuous, otherwise drop.
14: end if
15: Update the in-order verified length
16: if In-order verified length equals the OverallLength then
17:   Verify the OverallDigest. If verified, mark as "last fragment" so the PIT will clear state. Otherwise, drop.
18: end if

FIG. 6C

TABLE 680

Algorithm 2 PIT Logic
1: Input: Content fragment with {Name, OverallDigest, Payload-Offset, IntermediateState (IS)}
2: CaseA = False
3: CaseC = False
4: if OverallDigest entry is in the PIT then
5:   Forward and remove the PIT entry after the last fragment (it is marked by the Fragment Logic – see Algorithm 1)
6:   CaseA = True
7: end if
8: if The fragment has a Name with OverallDigest, PayloadOffset, IS state in it then
9:   if A PIT entry with that name exists then
10:     Treat as retransmission request and forward
11:   end if
12: end if
13: if CaseA = False and the fragment has a Name then
14:   if A PIT entry with that name exists then
15:     Create a PIT entry by OverallDigest with same reverse path.
16:   end if
17:   Forward on that PIT entry as above
18:   Remove the PIT entry by name
19:   CaseC = True
20: end if
21: if CaseC = False and the name has fOverallDigest, PayloadOffset, ISg state in it then
22:   if A PIT entry with name but not the state exists then
23:     Proceed as in block line 13.
24:   end if
25: end if
26: Otherwise, drop the fragment.

FIG. 6D

NETWORK NAMED FRAGMENTS IN A CONTENT CENTRIC NETWORK

CROSS-REFERENCE TO RELATED APPLICATION

This application is a continuation of U.S. application Ser. No. 14/851,894, filed Sep. 11, 2015, the entirety of which is incorporated herein by reference.

BACKGROUND

Field

This disclosure is generally related to distribution of digital content. More specifically, this disclosure is related to a system and method for secure and efficient transportation of content in a content centric network based on a fragmentation protocol.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. Generally, interests and content objects travel through a number of links before they can reach their destination. Each link can have its own maximum transmission unit (MTU), where the differing MTU limits impose different fragmentation requirements. End-to-end CCN fragmentation is described in U.S. patent application Ser. Nos. 14/065,691 and 14/067,587, and cut-through forwarding of CCN message fragments with IP encapsulation is described in U.S. patent application Ser. No. 14/309,681.

Fragmentation protocols related to CCN continue to evolve. One secure fragmentation protocol for CCN is known as Fragmentation with Integrity Guarantees and Optional Authentication (FIGOA), described in Ghali et al., "Secure Fragmentation for Content-Centric Networks," *Computing Research Repository,* 1405.2861 (2014), which disclosure is herein incorporated by reference in its entirety. The FIGOA protocol operates by creating fragments that are chained via hash computation, transmitting fragments with a name that match an interest for the name, and including a signature in the final fragment. However, under the FIGOA protocol, a content producer signs the final fragment, which creates a delayed verification of the signature by a requesting entity until all fragments have been received. This delayed verification may decrease the overall throughput of data and may also result in the injection of malicious packets, which can create inefficiencies and introduce security issues in the network. In addition, the FIGOA protocol does not provide a method to selectively request re-transmission of a specific fragment. When a fragment is dropped, the requesting entity re-requests the entire data stream, resulting in further inefficiencies in the network.

SUMMARY

One embodiment provides a system that facilitates efficient and secure transportation of content over a network. During operation, the system receives, by an intermediate node, a packet that corresponds to a fragment of a content object message that is fragmented into a plurality of fragments. One or more fragments of the plurality of fragments indicate a unique name. The received fragment indicates an intermediate state which is based on a hash function performed on an intermediate state from a previous fragment and data included in the received fragment. In response to determining that the received fragment is a first fragment, the system identifies a first entry in a pending interest table for an interest with a name that is based on a hash of a content object and that corresponds to the first fragment, and creates a second entry in the pending interest table based on a digest or a segment identifier for the content object message.

BRIEF DESCRIPTION OF THE FIGURES

FIG. 2A illustrates an exemplary format for a first fragment of a content object message, in accordance with an embodiment of the present invention.

FIG. 2B illustrates an exemplary format for a subsequent fragment of a content object message, in accordance with an embodiment of the present invention.

FIG. 2C illustrates an exemplary format for a first fragment of a content object message, where the content object message is part of a live stream, in accordance with an embodiment of the present invention.

FIG. 2D illustrates an exemplary format for a subsequent fragment of a content object message, where the content object message is part of a live stream, in accordance with an embodiment of the present invention.

FIG. 2E illustrates an exemplary format for a final fragment of a content object message, where the content object message is part of a live stream, in accordance with an embodiment of the present invention.

FIG. 6C presents a table illustrating an exemplary algorithm for processing a fragment of a content object message, in accordance with an embodiment of the present invention.

FIG. 6D presents a table illustrating an exemplary algorithm for processing a fragment of a content object message in a pending interest table, in accordance with an embodiment of the present invention.

In the figures, like reference numerals refer to the same figure elements.

DETAILED DESCRIPTION

Figure 1:
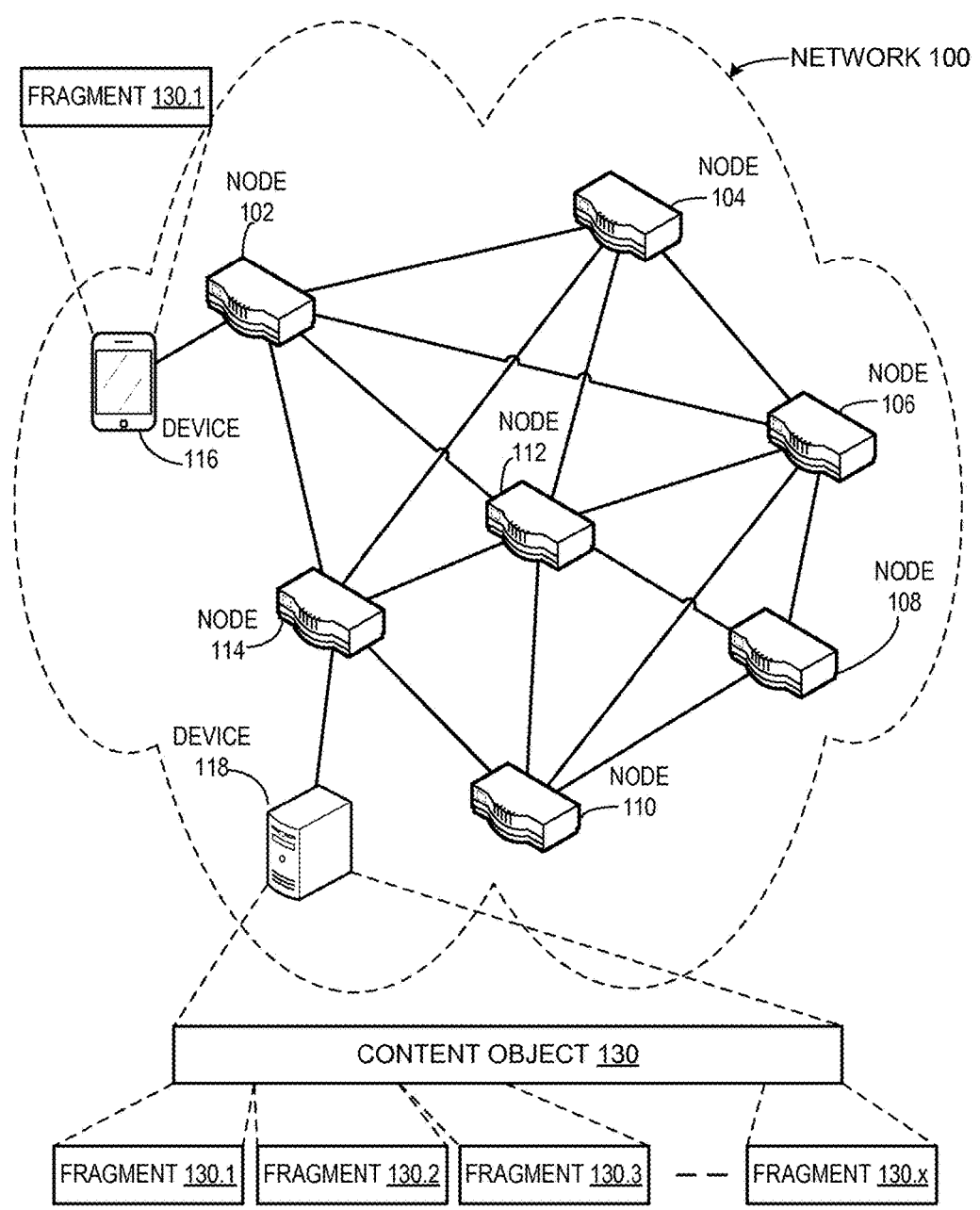
FIG. 1 illustrates an exemplary network facilitating efficient and secure transportation of content over a network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates transportation of content over a content centric network based on a fragmentation protocol which uses efficient signature verification and allows for selective retransmission of individual fragments. One fragmentation scheme for transporting CCN content is known as Fragmentation with Integrity Guarantees and Optional Authentication (FIGOA). Under the FIGOA scheme, a content producer can fragment a content object and chain the fragments with a hash chain, where each fragment contains an intermediate state that is calculated based on the intermediate state from the previous fragment and the data from the respective fragment. Each fragment in FIGOA includes the full name of the content object message, while the signature of the producer is included only in the final fragment. The signature verification relies on the final state of the hash chain, which can only be computed when the final fragment is received. In addition, because the same name is included in each fragment, FIGOA does not provide a way to perform retransmission requests for a specific fragment or group of fragments.

Embodiments of the present invention address these inefficiencies by providing a fragmentation protocol also known as the Network Named Fragments (NNF) protocol that allows for more efficient signature verification and directly addressing individual CCN content object fragments. In the NNF protocol, the signature of the content producer is included in the first fragment, which makes the signature immediately verifiable. Subsequent fragments each contain an intermediate state which is based on a hash of the data of the respective fragment and the intermediate state from the previous fragment. Thus, the signature on the first fragment creates the root of a trusted hash chain for the remainder of the fragments.

In addition, the NNF protocol uniquely identifies each fragment based on certain state characteristics, such as overall digest, payload offset, and intermediate state (as described below in relation to FIGS. 2A-2B). These state characteristics can be encoded into the name of the fragment to allow selective retransmission of a specific fragment. The encoded name allows a content requestor (or an intermediate node), upon determining that a specific fragment of a stream has not been received, to selectively request the fragment by its unique name, thus obviating the need to re-request the entire stream.

The overall length of the fragmented content is not limited to a specific length, which allows for the transmission of large payloads. Content sent based on the NNF protocol can be very long content with a known digest (e.g., a video file), or can be segments where the digest is not known until the end of the segment (e.g., a live video stream). In the case of a segmented stream, a content producer sending data based on the NNF protocol can generate and include a same segment identifier in each segment. The producer signs the final fragment only after the overall digest is known (e.g., has been calculated based on the intermediate state of the previous hash chain), thus binding the segment identifier to the overall digest.

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Network and Communication

FIG. 1 illustrates an exemplary network 100 that facilitates efficient and secure transportation of content over a network, in accordance with an embodiment of the present invention. Network 100 can be a content centric network (CCN) and can include a client device 116, a content producing device 118, and a router or other forwarding device at nodes 102, 104, 106, 108, 110, 112, and 114. A CCN router can be a CCN forwarding device residing on top of an IP router. In other words, CCN can be implemented as an overlay on top of IP. Other CCN overlay architecture is also possible. A node can be a computer system, an endpoint representing users, and/or a device that can generate interests or originate content.

A requesting entity (such as device 116) can generate an interest in a piece of content and send it to node 102. Intermediate nodes (such as CCN routers 102, 104, 112, and 114) can receive and forward the interest. A content producer (such as device or content producer 118) can satisfy the requested interest. Producer 118 can fragment a responsive content object 130 into x number of fragments, e.g., fragments 130.1-130.x. Producer 118 can sign the first fragment (as described below in relation to FIGS. 2A and 2B), and create a trusted hash chain of the remaining fragments (as described below in relation to FIGS. 3A and 3B). Producer 118 can immediately begin forwarding fragments 130.1-130.x, which fragments will travel the reverse path as the interest (e.g., to nodes 114, 112, 104, and 102) and reach device 116. Upon receiving the first fragment (e.g., fragment 130.1), device 116 can immediately verify the signature for the first fragment, which creates the root of the trusted hash chain for the remainder of the fragments. Device 116 can efficiently continue to receive the remainder of the trusted fragments without the delay incurred from a signature verification that can only occur when the final fragment has been received (as under the FIGOA protocol). Note that in CCN, intermediate nodes can, but are not required to, perform signature verification. Thus, the same efficiencies can be gained for signature verification performed by an intermediate node as for a requesting device. Device 116 can receive content object fragments 130.1-130.x and reassemble content object 130.

It is important to note the benefit for the consumer of signing the first fragment, when the overall digest and overall length are known ahead of time. If the last fragment is signed, instead, then a consumer must buffer all the prior fragments and wait for all the content to be received and the signature verified before using the data. Firewall systems checking signatures must likewise either buffer all fragments or pass them and only drop the last fragment if it fails verification. Because the first fragment is signed, the consumer can begin signature verification in parallel with receiving later fragments, as opposed to the last fragment begin signed where the signature verification time cannot be amortized over network time. One example can be seen in Guneysu et al., "Software Speed Records for Lattice-Based Signatures," Post-Quantum Cryptography, Volume 7932:67-82, Lecture Notes in Computer Science ("Guneysu"). Guneysu finds that RSA 2048-bit signature verification takes 77,032 CPU cycles, elliptical curve takes 209,328 CPU cycles, and an optimized lattice signature verification takes 45,036 CPU cycles. Assuming a 3 GHz CPU, these times are 25.6 usec, 69.8 usec, and 15.0 usec, respectively. On a 10 Gbps link, a 1500 byte packet takes approximately 1.2 usec, so these delays are between 12.5 to 58 packet times.

Exemplary Format of CCN Content Object Message Fragments

FIG. 2A illustrates an exemplary format for a first fragment 210 of a content object message, in accordance with an embodiment of the present invention. First fragment 210 can include the following fields: a name 211 that can indicate the name of the content object and also contain encoded information to specifically identify the fragment; an overall digest 212 that is the digest of the entire fragmented payload for the CCN content object message; a payload offset 213 that is the byte offset where this fragment begins; an intermediate state 214 that is a value calculated based on the initialization vector and the payload or data associated with this fragment (e.g., data 216); an overall length 215 that is the total length of the entire fragmented payload; a data 216 that is the payload of this fragment and one of the input fields for the hash function to calculate intermediate state 214); and a signature 217 that is the signature of the producer of the content object message. First fragment 210 cannot be re-fragmented by an intermediate node, as described below in relation to FIG. 6A. Thus, first fragment 210 may contain no payload (e.g., no data 216) or a payload with a size smaller than a known MTU of the network.

FIG. 2B illustrates an exemplary format for a subsequent fragment 220 of a content object message, in accordance with an embodiment of the present invention. Subsequent fragment 220 can include similar fields as first fragment 210 of FIG. 2A. For example, subsequent fragment 220 can include the following fields: a name 221; an overall digest 222; a payload offset 223; an intermediate state 224; and a data 225. Name 221 can be optional in subsequent fragments when CCNx Nameless Objects are supported (as described in U.S. patent application Ser. No. 14/337,026). Under the NNF protocol, the name is included in the first fragment. Intermediate state 224 for subsequent fragment 220 is calculated based on a hash function performed on the intermediate state 214 of the previous fragment (e.g., intermediate state 214 of first fragment 210).

Overall digests 212 and 222 can be included in first fragment 210 and subsequent fragment 220, respectively, when the hash chain and the final overall digest is known in advance, e.g., when fragmenting a known file. The NNF protocol provides a slightly different format for the case of an unterminated data stream transmitted in segments of known length with a deferred digest computation, e.g., a live stream. FIG. 2C illustrates an exemplary format for a first fragment 230 of a content object message, where the content object message is part of a live stream, in accordance with an embodiment of the present invention. First fragment 230 can include similar fields as first fragment 210 of FIG. 2A. For example, first fragment 230 can include the following fields: a name 231; a payload offset 233; an intermediate state 234; and a data 236. First fragment 230 can also include a segment identifier 232 that is generated by a content producer and is included in all fragments of, e.g., a live data stream. In addition, first fragment 230 can include an overall length 235 that, as the total length of the stream is unknown, can include the length of the current segment. Unlike first fragment 210, first fragment 230 does not include a signature.

FIG. 2D illustrates an exemplary format for a subsequent fragment 240 of a content object message, where the content object message is part of a live stream, in accordance with an embodiment of the present invention. Subsequent fragment 240 can include similar fields as first fragment 230. For example, subsequent fragment can include a name 241, a segment identifier 242, a payload offset 243, an intermediate state 244, and a data 245. Subsequent fragment 240 does not include a signature or an overall length.

FIG. 2E illustrates an exemplary format for a final fragment 250 of a content object message, where the content object message is part of a live stream, in accordance with an embodiment of the present invention. Final fragment 250 can include similar fields as first fragment 230. For example, final fragment 250 can include a name 251, a segment identifier 252, a payload offset 253, an intermediate state 254, and a data 255. In addition to these fields, final fragment 250 can include an overall digest 256 that is calculated by the producer based on the hash chain of all of the fragmented data (as described below in relation to FIG. 5B). Final fragment 250 can also include a signature 257 of the producer of the content, where signature 257 binds the overall digest to the segment identifier for the content object message.

Figures 3A, 3B:
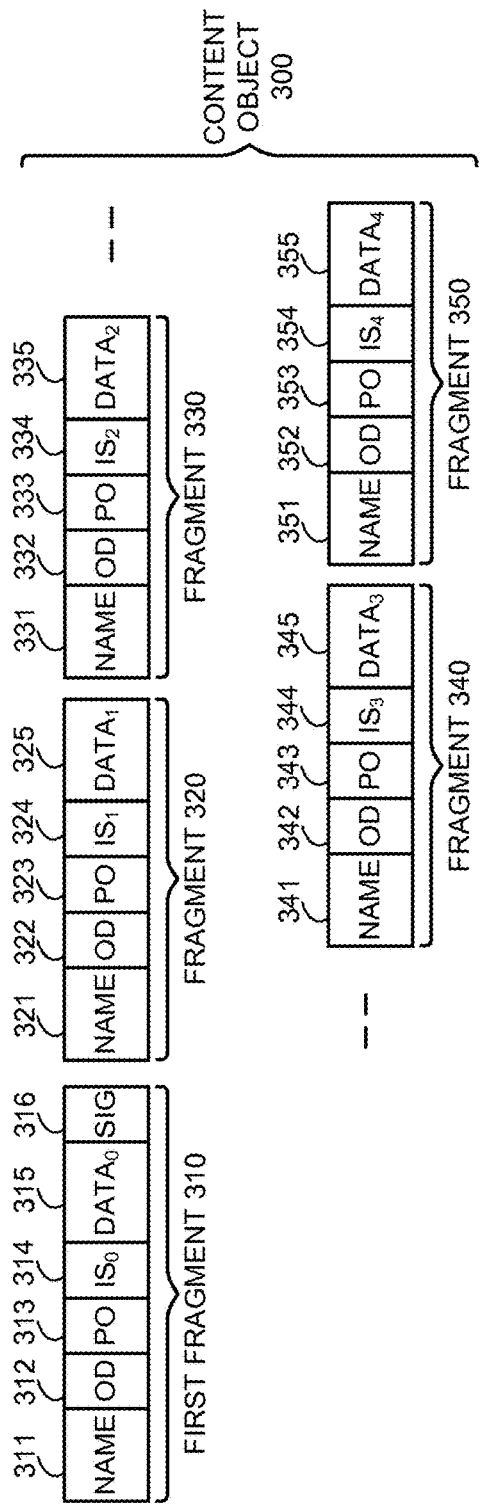
FIG. 3A illustrates a fragmented content object, in accordance with an embodiment of the present invention.
FIG. 3B presents a table illustrating a chained hash calculation of the intermediate state corresponding to the fragments of the content object of FIG. 3A, in accordance with an embodiment of the present invention.

FIG. 3A illustrates a fragmented content object 300, in accordance with an embodiment of the present invention. Content object 300 includes a first fragment 310, which includes a name 311, an overall digest 312, a payload offset 313, an intermediate state 314 ("$IS_0$"), a data 315 ("$DATA_0$"), and a signature 316. Fragments 320, 330, 340, and 350 include similar fields as first fragment 310, but do not include a signature field.

FIG. 3B presents a table 360 illustrating a chained hash calculation of the intermediate state corresponding to fragments 310-350 of content object 300 of FIG. 3A, in accordance with an embodiment of the present invention. In first fragment 310, intermediate state 314 (ISo) is calculated based on a hash of an initialization vector and data 315 ($DATA_0$) of first fragment 310. In subsequent fragment 320, intermediate state 324 ($IS_i$) is calculated based on a hash of the intermediate state of the previous fragment (ISo of fragment 310) and data 325 (DATAi) of fragment 320. Each subsequent fragment includes an intermediate state that is calculated based on a hash of the intermediate state of the previous fragment and the data of that subsequent fragment. Finally, an overall digest 352 of fragment 350 is calculated based on a function of the intermediate state of the final fragment ($IS_4$ of fragment 350). The function can be a hash function or any other function which finalizes the output based on the input.

Selective Retransmission of a Fragment or Fragments

Because the NNF protocol uniquely identifies each fragment based on, e.g., {Name, OverallDigest, PayloadOffset, IntermediateState}, certain of these characteristics can be encoded into the name to uniquely address a fragment for selective retransmission. For example, Overall Digest ("OD"), Payload Offset ("PO"), and IntermediateState ("IS") can be encoded in the name for a fragment:

/parc.com/movie.alto.mkv/OD=123abc/P0=4096/
 IS=653efa  (1)

By using this naming convention, a requesting entity or intermediate node can selectively request a specific fragment.

It is not required to name every fragment. A producer may, for example, name every 3rd fragment. If the MTU is 1500 bytes, then the retransmission window in this case would be 4500 bytes. When a consumer loses one or more fragments in such a block, it only needs to send an interest for the closest prior named fragment and it will receive a retransmission of all fragments in that named block.

Note that the first fragment has two names. There is the general name, e.g. "/parc/com/movie.alto.mkv", which retrieves all fragments, and there is the fragment name, e.g. "/parc/com/movie.alto.mkv/OD=123abc/P0=0/ IS=6a09e667 . . . " where the IS in this case is the SHA-256 Initialization Vector. The fragment name would only retrieve the first fragment or first fragment block, not the entire set of fragments like the general name.

Similar to Name (1) above, a producer can name fragments of a segment with a Segment ID instead of an OverallDigest:

/parc/com/movie.alto.mkv/SID=444ddd/P0=4096/
 IS=135ace  (2)

An interest with a name similar to Name (2) enables retransmission of individual segment fragments or segment fragment blocks if not all fragments carry a name.

In addition, a requesting entity can selectively request a subset or chain of fragments by including the name and an additional payload size. For example, consider an interest with the following name:

/parc.com/movie.alto.mkv/OD=123abc/P0=4096/
 IS=653efa/PS=8192  (3)

If the size of each individual fragment is 1024B, an interest with Name (3) returns a chain of four fragments starting at byte offset 4096. Re-fragmentation can also occur. For example, consider an interest with the following name:

/parc.com/movie.alto.mkv/OD=123abc/P0=4096/
 IS=653efa/PS=7680  (4)

Similar to an interest with Name (3), an interest with name (4) returns a chain of four fragments. However, the fourth fragment of the chain is re-fragmented to 512B.

Fragmenting a Content Object of a Known Length

Figure 4A:
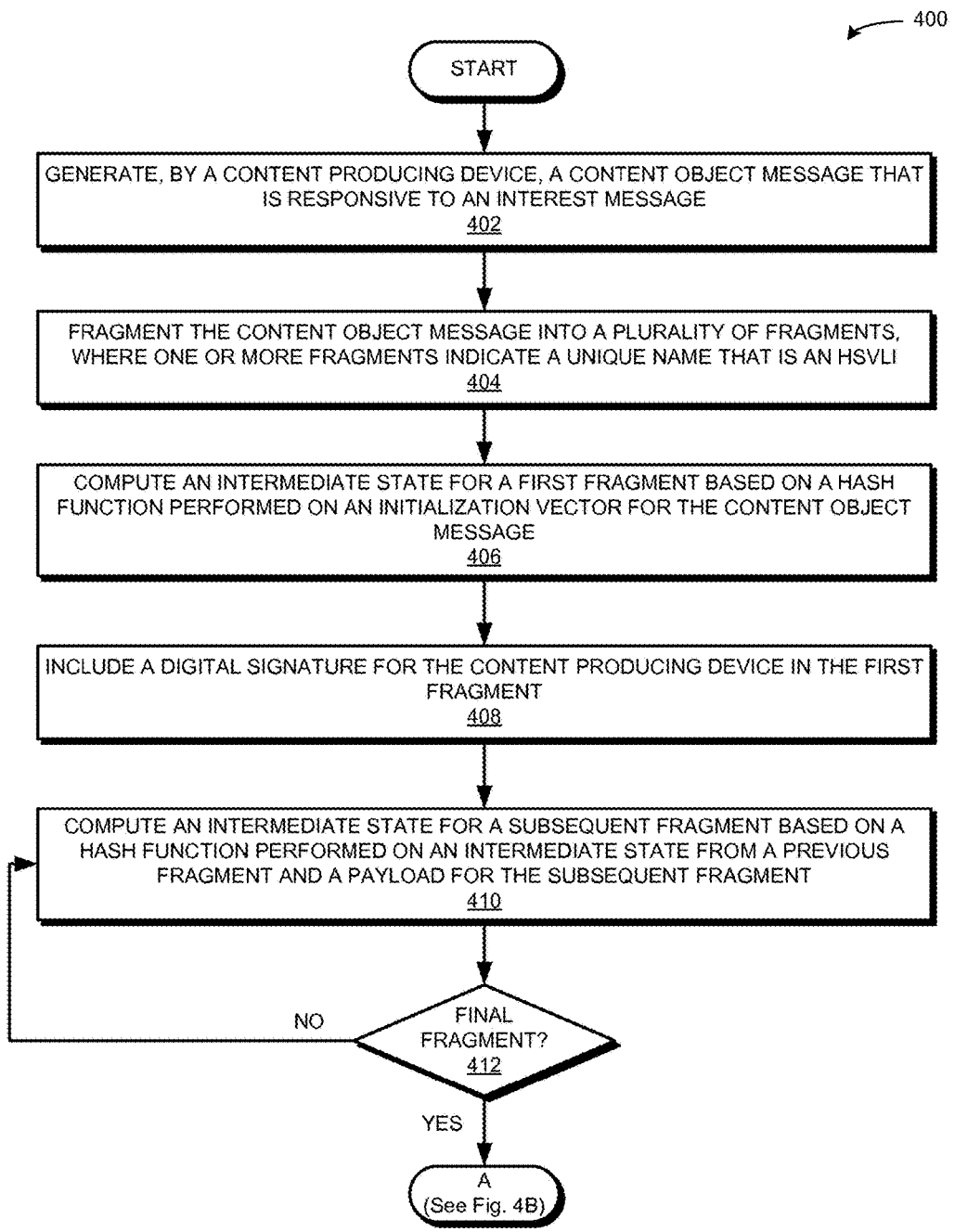
FIG. 4A presents a flow chart illustrating a method by a content producing device for fragmenting a content object message, in accordance with an embodiment of the present invention.

FIG. 4A presents a flow chart 400 illustrating a method by a content producing device for fragmenting a content object message, in accordance with an embodiment of the present invention. During operation, the system generates, by a content producing device or a content producer, a content object message that is responsive to an interest message (operation 402). The content producer fragments the content object message into a plurality of fragments, where one or more fragments indicate a unique name that is an HSVLI that comprises contiguous name components ordered from a most general level to a most specific level (operation 404). The content producer computes an intermediate state for a first fragment based on a hash function performed on an initialization vector for the content object message and the payload or data for the first fragment (operation 406). The content producer signs the first fragment by including a digital signature for the content producer in the first fragment (operation 408). The content producer computes an intermediate state for a subsequent fragment based on a hash function performed on the intermediate state from the previous fragment and the payload or data for the subsequent fragment (operation 410). The content producer determines whether the subsequent fragment is the final fragment (decision 412). If it is not, then the content producer repeats operation 410 on the next subsequent fragment. If it is the final fragment, then the operation continues as described by Label A in FIG. 4B.

Figure 4B:
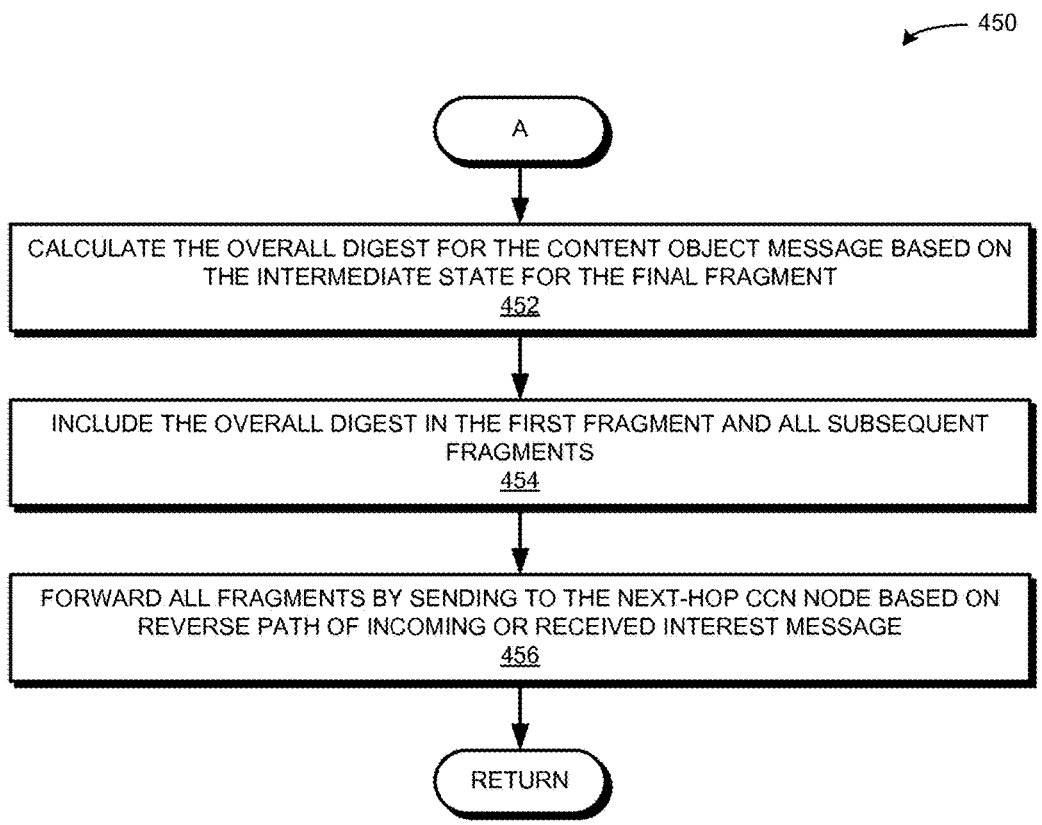
FIG. 4B presents a flow chart illustrating a method by a content producing device for fragmenting a content object message, in accordance with an embodiment of the present invention.

FIG. 4B presents a flow chart 450 illustrating a method by a content producing device for fragmenting a content object message, in accordance with an embodiment of the present invention. During operation, the system calculates, by a content producing device or a content producer, the overall digest for the content object message based on the intermediate state for the final fragment (operation 452). The content producer includes the overall digest in the first fragment and all subsequent fragments (operation 454). The content producer then forwards all fragments by sending each fragment to the next-hop CCN node based on the reverse path of the interest message (described in operation 402 of FIG. 4A).

Fragmenting a Content Object of an Unknown Length

Figure 5A:
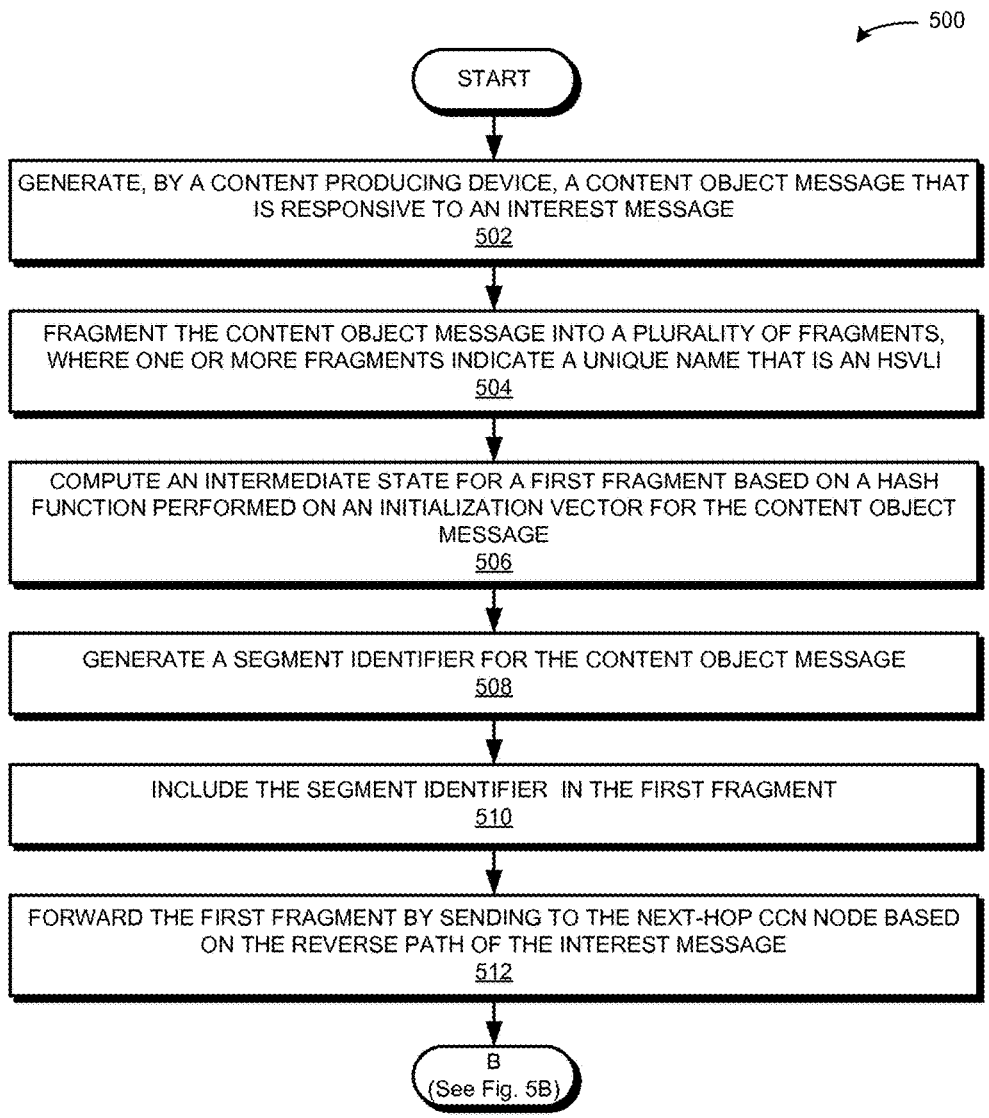
FIG. 5A presents a flow chart illustrating a method by a content producing device for fragmenting a content object message, where the data stream is a live stream, in accordance with an embodiment of the present invention.

FIGS. 4A and 4B depict fragmentation under the NNF protocol when the digest is known in advance, e.g., for a file of a known length like a video file. In some embodiments, the digest is not known in advance, e.g., for a file of an unknown length like a live data stream. FIG. 5A presents a flow chart 500 illustrating a method by a content producing device for fragmenting a content object message, where the data stream is a live stream, in accordance with an embodiment of the present invention. During operation, the system generates, by a content producing device or a content producer, a content object message that is responsive to an interest message (operation 502). The content producer fragments the content object message into a plurality of fragments, where one or more fragments indicate a unique name that is an HSVLI that comprises contiguous name components ordered from a most general level to a most specific level (operation 504). The content producer computes an intermediate state for a first fragment based on a hash function performed on an initialization vector for the content object message and the payload or data for the first fragment (operation 506). The content producer generates a segment identifier for the content object message (operation 508), and includes the segment identifier in the first fragment (operation 510). The content producer forwards the first fragment by sending the first fragment to the next-hop CCN node based on the reverse path of the interest message (operation 512). The operation continues as described by Label B in FIG. 5B.

Figure 5B:
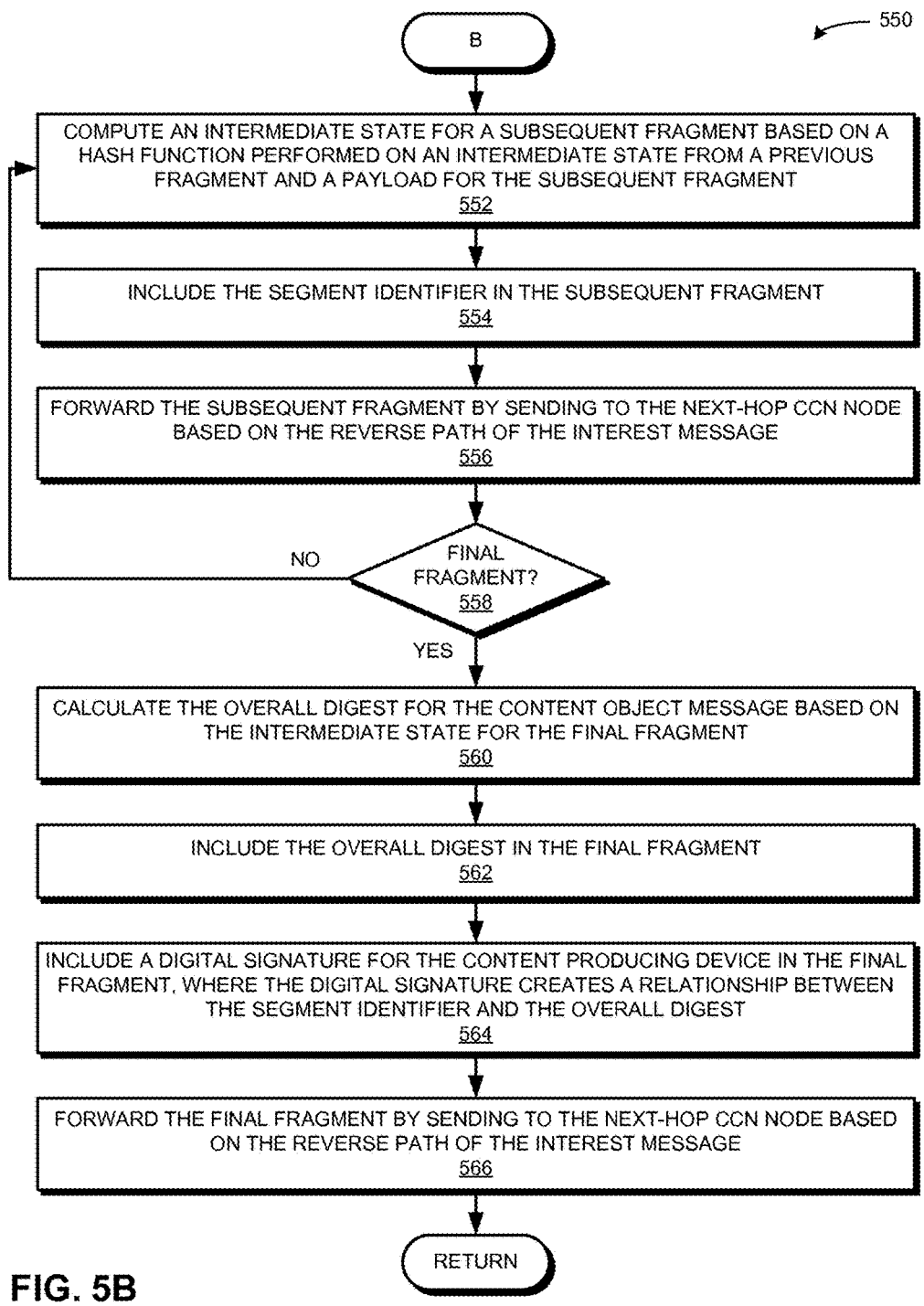
FIG. 5B presents a flow chart illustrating a method by a content producing device for fragmenting a content object message, where the data stream is a live stream, in accordance with an embodiment of the present invention.

FIG. 5B presents a flow chart 550 illustrating a method by a content producing device for fragmenting a content object message, where the data stream is a live stream, in accordance with an embodiment of the present invention. During operation, the content producer computes an intermediate state for a subsequent fragment based on a hash function performed on an intermediate state from a previous fragment and a payload or data for the subsequent fragment (operation 552). The content producer includes the segment identifier in the subsequent fragment (operation 554). The content producer forwards the subsequent fragment by sending it to the next-hop CCN node based on the reverse path of the interest message (operation 556).

The content producer then determines whether the subsequent fragment is the final fragment (decision 558). If it is not, then the content producer repeats operations 552, 554, and 556 for the next subsequent fragment. If it is the final fragment, then the content producer calculates the overall digest for the content object message based on the intermediate state for the final fragment (operation 560), and includes the overall digest in the final fragment (operation 562). The content producer signs the final fragment by including a digital signature for the content producer in the final fragment, where the digital signature creates a relationship or a binding between the segment identifier and the overall digest (operation 564). The final fragment can be a tail object that contains no payload and can be transmitted after the processing delay of calculating the overall digest. Because the tail object is signed, the size of the tail object remains small to avoid re-fragmentation by an intermediate node.

The content producer then forwards the final fragment by sending it to the next-hop CCN node based on the reverse path of the interest message (operation 566). Note that while operation 512 is depicted as occurring before operations 556 and 566, the first fragment may not arrive before the other fragments (e.g., the subsequent and final fragments). A requesting entity such as a content consumer processes the first fragment as the root of the hash chain before trusting, processing, and reassembling the remaining fragments.

Processing a Fragment of a Content Object of a Known Length

Figure 6A:
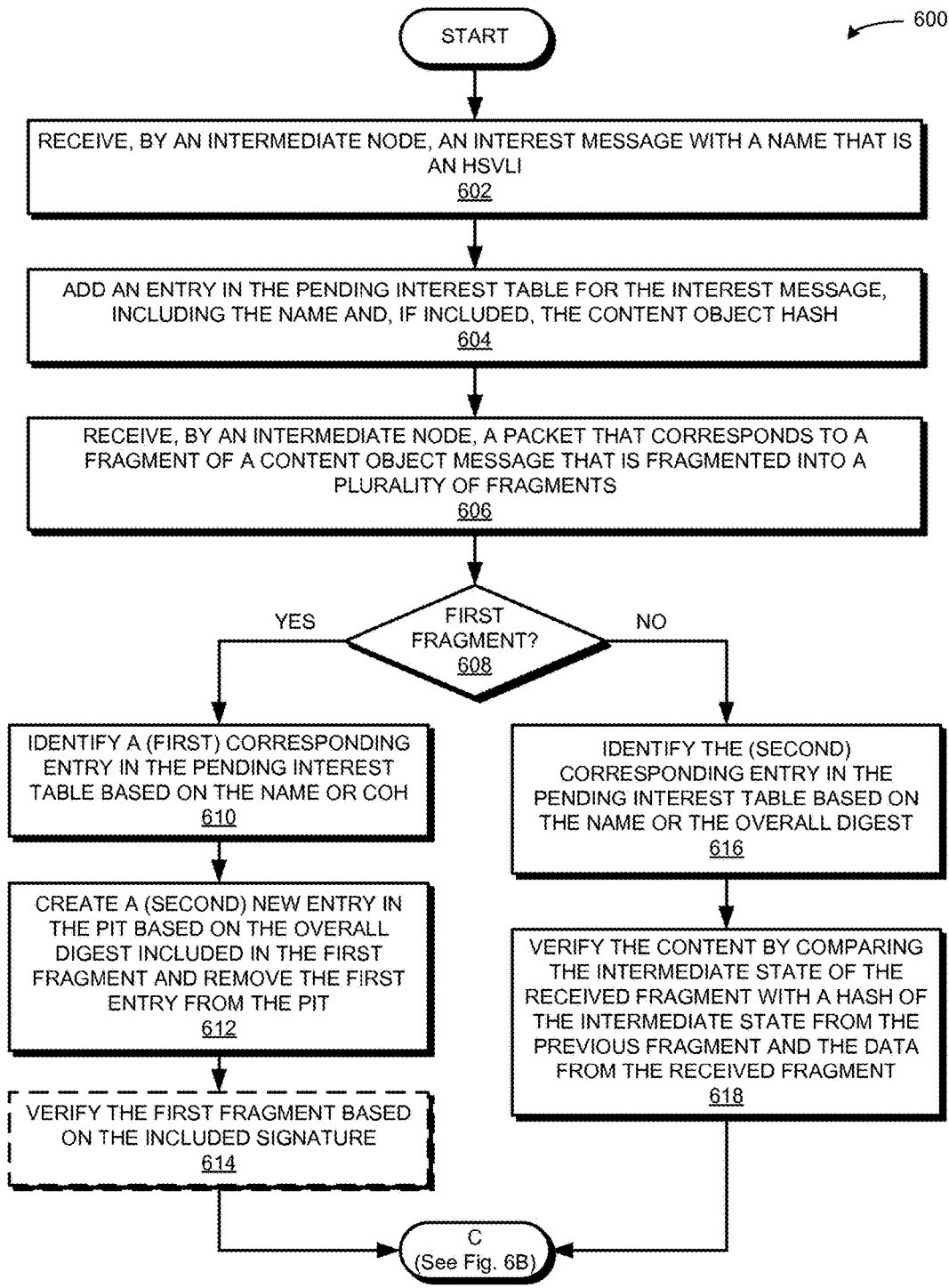
FIG. 6A presents a flow chart illustrating a method by an intermediate node for processing a fragment of a content object message, in accordance with an embodiment of the present invention.

FIG. 6A presents a flow chart 600 illustrating a method by an intermediate node for processing a fragment of a content object message, in accordance with an embodiment of the present invention. During operation, the system receives, by an intermediate node, an interest message with a name that is an HSVLI (operation 602). The interest may also include a content object hash restriction. For example, the name can be a hash-based name that includes the content object hash restriction. The intermediate node adds an entry in its pending interest table (PIT) for the interest message, including the name and, if included, the content object hash (operation 604). The intermediate node subsequently receives a packet that corresponds to a fragment of a content object message that is fragmented into a plurality of fragments (operation 606). One or more of the plurality of fragment indicate a unique name that is an HSVLI. The received fragment indicates an intermediate state which is based on a hash function performed on an intermediate state from a previous fragment and data included in the received fragment.

The intermediate node determines if the received fragment is the first fragment (decision 608). If the received fragment is the first fragment, the intermediate node identifies a corresponding entry in the PIT ("first entry") based on the name or the content object hash for the first fragment (operation 610). The first fragment can be a signed content object that includes the name, the KeyId, the content object hash, the overall length, and the overall digest. The intermediate node creates a new entry in the PIT ("second entry") based on the overall digest included in the first fragment, and removes the first entry from the PIT (operation 612). The second PIT entry can also include the overall length. Because the signature is included in the first fragment, the intermediate node can optionally perform a signature verification procedure (operation 614). The intermediate node can also verify the content by computing the hash of the initialization vector and the data from the first fragment, and comparing the result with the intermediate state included in the first fragment (not shown in FIG. 6A). The hash is computed over the first fragment, unlike in FIGOA where the content object hash of an interest matches the overall digest value, which can only be verified after all fragments are received. Thus, under the NNF protocol, the first fragment contains no payload or a payload of a small size such that an intermediate node will not re-fragment the first fragment.

If the received fragment is not the first fragment, the intermediate node identifies the corresponding entry in the PIT (e.g., the second entry) based on the name or the overall digest (operation 616). The intermediate node can verify the content by computing the hash of the intermediate state from the previous fragment and the data from the received fragment, and comparing the result with the intermediate state included in the received fragment (operation 618). The operation then continues as described by Label C in FIG. 6B.

Figure 6B:
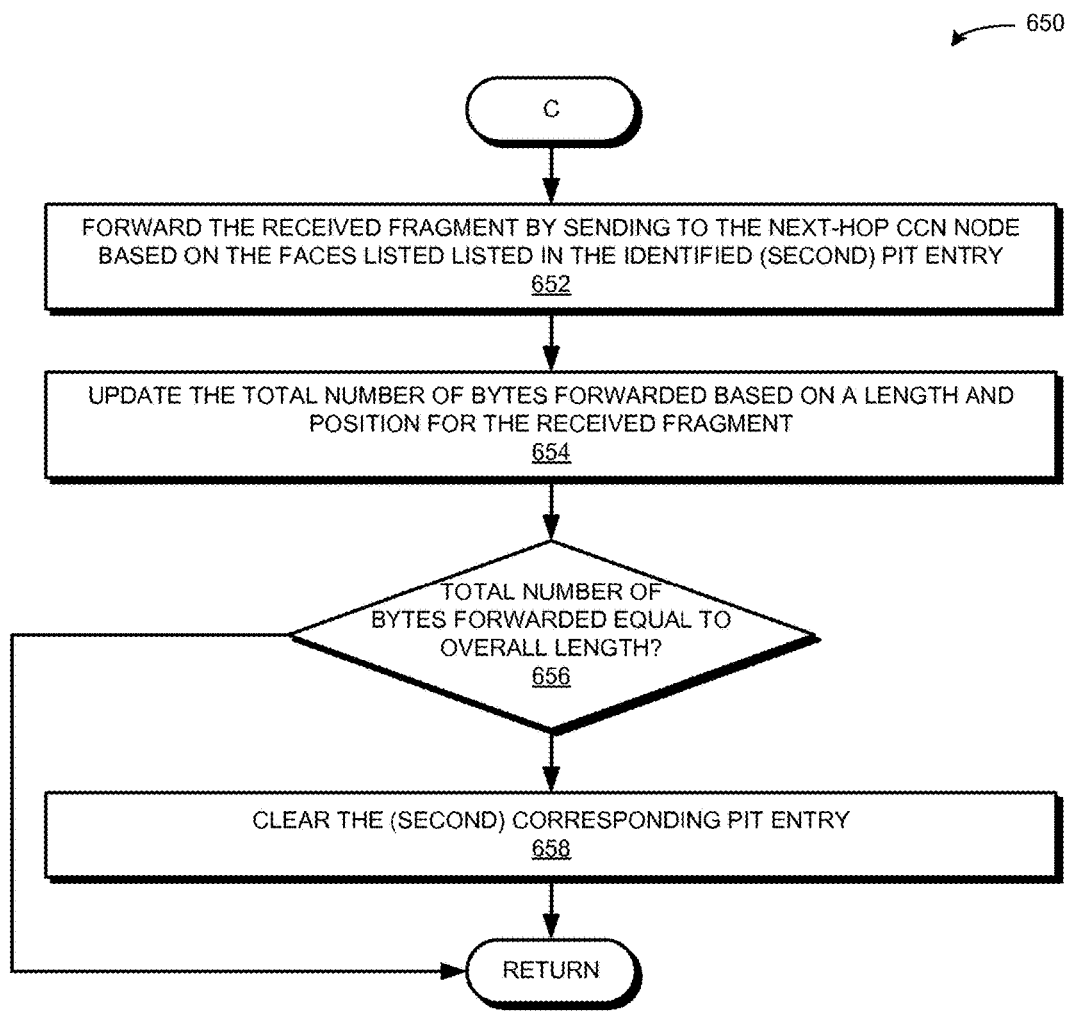
FIG. 6B presents a flow chart illustrating a method by an intermediate node for processing a fragment of a content object message, in accordance with an embodiment of the present invention.

FIG. 6B presents a flow chart 650 illustrating a method by an intermediate node for processing a fragment of a content object message, in accordance with an embodiment of the present invention. During operation, the intermediate node forwards the received fragment by sending it to the next-hop CCN node based on the faces listed in the identified PIT entry (e.g., the second entry) (operation 652). The intermediate node updates the total number of bytes forwarded based on a length and a position for the received fragment (operation 654). The intermediate node determines whether the total number of bytes forwarded is equal to the overall length for the content object message (as indicated in the second PIT entry) (operation 656). If it does not, the operation returns. If it does, the intermediate node clears the corresponding PIT entry (e.g., the second PIT entry) (operation 658).

Exemplary Algorithms for Processing a Fragment of a Content Object

FIG. 6C presents a table 670 illustrating an exemplary algorithm 1 for processing a fragment of a content object message, in accordance with an embodiment of the present invention. Note that the intermediate node is not required to cache any fragments, as the reassembly buffer "Buffer" only stores a chain of entries with {CurrentIS, NextIS, PayloadOffset, PayloadEnd}. The intermediate node stores the entries in order of PayloadOffset. The intermediate node creates an initial buffer entry with the SHA-256 initialization value and PayloadOffset of 0 and PayloadEnd of 0. All received fragments form a chain from the initial buffer entry. The next four rules are as per FIGOA: the first rule stores a singleton without predecessor or successor (steps 6-7); the second rule stores a fragment that continues a previous fragment (steps 8-9); the third rule stores a fragment that precedes a fragment (steps 10-11); and the fourth rule stores a fragment in between two existing fragments (steps 12-13). Upon storing and verifying a fragment, the intermediate node updates the "in-order" verified length to track the number of bytes verified in the hash chain. Upon verifying OverallLength bytes (indicating receipt of all fragments), the intermediate may verify the OverallDigest. If the current fragment is the fragment on which the intermediate node verified the OverallDigest, the intermediate node can locally mark this packet as the "last fragment" to indicate that the PIT may clear its state.

FIG. 6D presents a table 680 illustrating an exemplary algorithm 2 for processing a fragment of a content object message in a pending interest table, in accordance with an embodiment of the present invention. If the fragments are received in order, the first fragment has a name that matches an existing PIT entry. The intermediate node then creates a new PIT entry by OverallDigest and removes the PIT entry by name. Subsequent fragments output by Algorithm 1 will match on OverallDigest. However, if the fragments are not received in order, Algorithm 2 covers several conditions. If a PIT entry by OverallDigest exists, the intermediate node forwards along that PIT entry (steps 4-7). If the fragment has fragment state in the name, it may be a retransmission and can be matched against its own PIT entry by name (steps 8-12). If the previous lookup fails, the intermediate node creates the PIT entry by OverallDigest (steps 13-20). If a named fragment arrives before a chunk named fragment and the named fragment contains the fragment state in the name, the intermediate node strips the fragment state from the name and proceeds as for a chunk named fragment (steps 21-25).

Processing a Fragment of a Content Object of an Unknown Length

Figure 7:
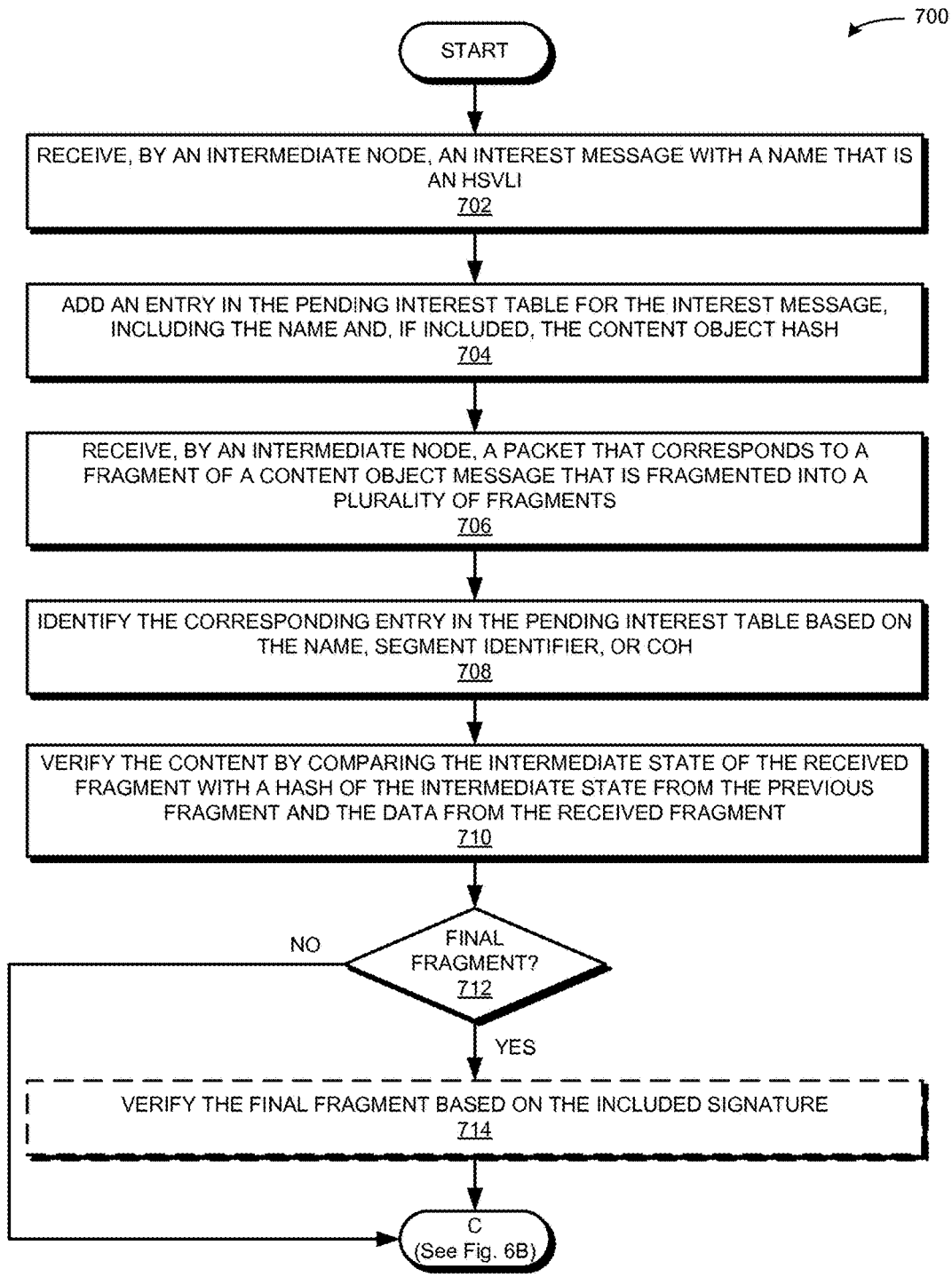
FIG. 7 presents a flow chart illustrating a method by an intermediate node for processing a fragment of a content object message, where the data stream is a live stream, in accordance with an embodiment of the present invention.

FIG. 7 presents a flow chart 700 illustrating a method by an intermediate node for processing a fragment of a content object message, where the data stream is a live stream, in accordance with an embodiment of the present invention. The first three operations (702, 704, and 706) of FIG. 7 are similar to operations 602, 604, and 606 of FIG. 6A. The main difference is that in step 706, the received fragment includes a segment identifier instead of the overall digest, and the signature is included in the final fragment instead of in the first fragment. Upon receiving the fragment, the intermediate node identifies a corresponding entry in the PIT ("second entry") based on the name, the segment identifier, or the content object hash for the first fragment (operation 708). In some embodiments, if the received fragment is the first fragment, the intermediate node identifies a first entry in the PIT based on the name, creates the second entry based on the segment identifier, and removes the first entry from the PIT (not shown). The intermediate node verifies the content by computing the hash of the intermediate state from the previous fragment and the data from the received fragment, and comparing the result with the intermediate state included in the received fragment (operation 710). The intermediate node determines if the received fragment is a final fragment (decision 712). If the received fragment is not the final fragment, the operation continues as described by Label C in FIG. 6B. If the received fragment is the final fragment, because the signature is included in the final fragment and the intermediate node can optionally perform a signature verification procedure (operation 714) before continuing as described by Label C in FIG. 6B.

Exemplary Apparatus and Computer System

Figure 8:
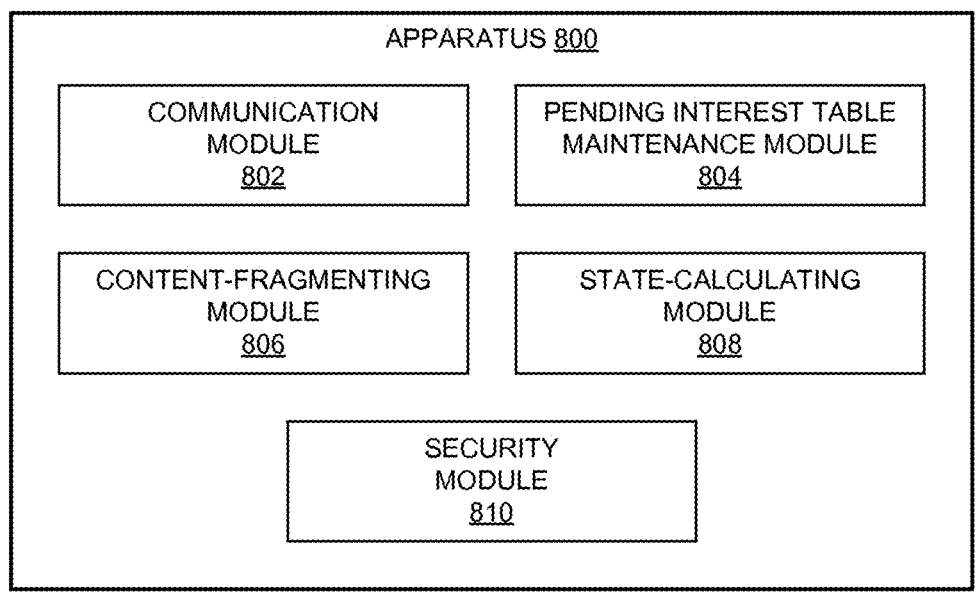
FIG. 8 illustrates an exemplary apparatus that facilitates efficient and secure transportation of content over a network, in accordance with an embodiment of the present invention.

FIG. 8 illustrates an exemplary apparatus 800 that facilitates efficient and secure transportation of content over a network, in accordance with an embodiment of the present invention. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, a pending interest table maintenance module 804, a content-fragmenting module 806, a state-calculating module 808, and a security module 810.

In some embodiments, communication module 802 can send and/or receive data packets to/from other network nodes across a computer network, such as a content centric network, where a data packet can correspond to a fragment of a content object message that is fragmented into a plurality of fragments. In response to determining that the received fragment is a first fragment, PIT maintenance module 804 can: identify a first entry in a PIT for an interest with a name that is based on a hash of a content object and that corresponds to the first fragment; create a second entry in the PIT based on a digest or a segment identifier for the content object message; and remove the first entry from the PIT. In response to determining that the received fragment is a subsequent fragment, PIT maintenance module 804 can identify an entry in the pending interest table for an interest with a digest or a segment identifier that corresponds to the subsequent fragment. In response to determining that the received fragment corresponds to an entry in the pending interest table, PIT maintenance module 804 can update the total number of bytes forwarded based on a length and a position for the received fragment. In response to determining that the total length of bytes forwarded is equal to the overall length, PIT maintenance module 804 can also remove the corresponding entry from the PIT.

Content-fragmenting module 806 can generate, by a content producing device, a content object message that is responsive to an interest message, and can fragment the content object message into a plurality of fragments. Content-fragmenting module 806 can also include in the first fragment no payload or a payload with a size smaller than a predetermined threshold that does not require re-fragmentation. State-calculating module 808 can compute an intermediate state for a first fragment based on a hash function performed on an initialization vector for the content object message. State-calculating module 808 can also compute an intermediate state for a subsequent fragment based on a hash function performed on an intermediate state from a previous fragment and a payload for the subsequent fragment.

Security module 810 can include in the first fragment a digital signature of the content producing device. Content-fragmenting module 806 can generate a segment identifier for the content object message, and can include the segment identifier in each fragment of the plurality of fragments. In response to determining that the content object message is completely generated, content-fragmenting module 806 can generate a final fragment. State-calculating module 808 can compute a digest for the complete content object message based on a hash function performed on the intermediate state from a previous fragment and a payload for the final fragment. Security module 810 can include in the final fragment a digital signature of the content producing device.

Figure 9:
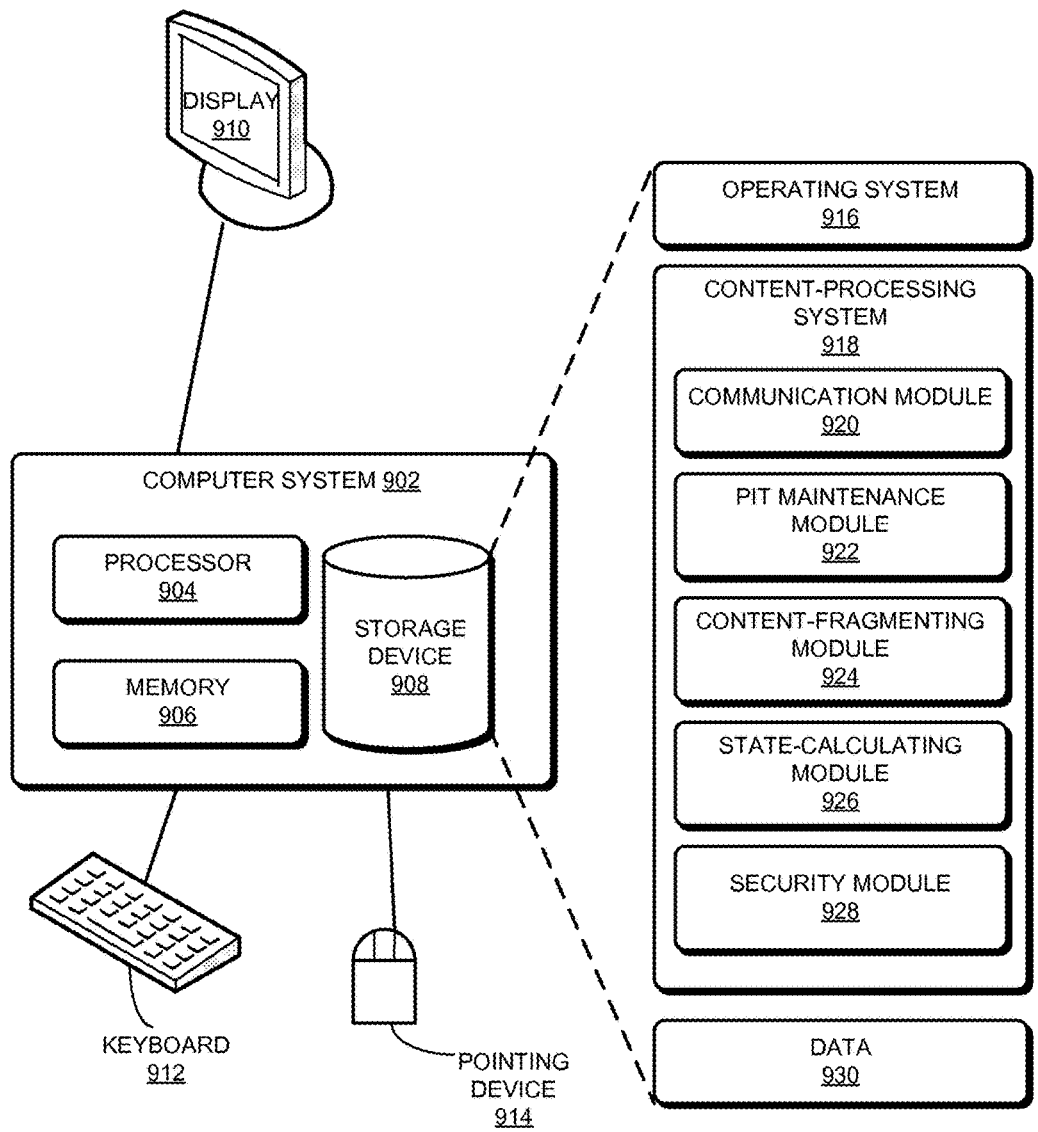
FIG. 9 illustrates an exemplary computer system that facilitates efficient and secure transportation of content over a network, in accordance with an embodiment of the present invention.

FIG. 9 illustrates an exemplary computer system that facilitates efficient and secure transportation of content over a network, in accordance with an embodiment of the present invention. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 930.

Content-processing system 918 can include instructions, which when executed by computer system 902, can cause computer system 902 to perform methods and/or processes described in this disclosure. Specifically, content-processing system 918 may include instructions for sending and/or receiving data packets to/from other network nodes across a computer network, such as a content centric network (communication module 920). For example, content-processing system 918 can include instructions for receiving, by an intermediate node, a data packet that corresponds to a fragment of a content object message that is fragmented into a plurality of fragments (communication module 920).

Content-processing system 918 can include instructions for, in response to determining that the received fragment is a first fragment, identifying a first entry in a PIT for an interest with a name that is based on a hash of a content object and that corresponds to the first fragment (PIT maintenance module 922). Content-processing system 918 can also include instructions for creating a second entry in the PIT based on a digest or a segment identifier for the content object message, and removing the first entry from the PIT (PIT maintenance module 922). Content-processing system 918 can include instructions for, in response to determining that the received fragment is a subsequent fragment, identifying an entry in the pending interest table for an interest with a digest or a segment identifier that corresponds to the subsequent fragment (PIT maintenance module 922). Content-processing system 918 can also include instructions for, in response to determining that the received fragment corresponds to an entry in the pending interest table, updating the total number of bytes forwarded based on a length and a position for the received fragment. Content-processing system 918 can additionally include instructions for, in response to determining that the total length of bytes forwarded is equal to the overall length, removing the corresponding entry from the PIT (PIT maintenance module 922).

Content-processing system 918 can include instructions for generating a content object message that is responsive to an interest message, and can fragment the content object message into a plurality of fragments (content-fragmenting module 924). Content-processing system 918 can include instructions for including in the first fragment no payload or a payload with a size smaller than a predetermined threshold that does not require re-fragmentation (content-fragmenting module 924).

Content-processing system 918 can include instructions for computing an intermediate state for a first fragment based on a hash function performed on an initialization vector for the content object message, and for computing an intermediate state for a subsequent fragment based on a hash function performed on an intermediate state from a previous fragment and a payload for the subsequent fragment (state-calculating module 926).

Content-processing system 918 can also include instructions for including in the first fragment a digital signature of the content producing device (security module 928). Content-processing system 918 can include instructions for generating a segment identifier for the content object message, and for including the segment identifier in each fragment of the plurality of fragments (content-fragmenting module 924). Content-processing system 918 can include instructions for, in response to determining that the content object message is completely generated, generating a final fragment (content-fragmenting module 924). Content-processing system 918 can include instructions for computing a digest for the complete content object message based on a hash function performed on the intermediate state from a previous fragment and a payload for the final fragment (state-calculating module 926), and for including in the final fragment a digital signature of the content producing device (security module 928).

Data 930 can include any data that is required as input or that is generated as output by the methods and/or processes described in this disclosure. Specifically, data 930 can store at least: a packet that corresponds to a fragment of a content object message that is fragmented into a plurality of fragments; a unique name that is an HSVLI that comprises contiguous name components ordered from a most general level to a most specific level; a name that is based on a hash of a content object or that indicates a digest; an intermediate state for a fragment which is based on a hash function performed on an intermediate state from a previous fragment and data included in the fragment; a pending interest table; a digest for a content object; a segment identifier; a byte offset that corresponds to a starting byte for a fragment; an overall length for a content object; a payload size; an entry in a pending interest table; a digital signature of a content producing device; a total number of bytes forwarded; and a name that indicates the intermediate state, the byte offset, and the digest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

In summary, in one aspect, a system is provided, comprising: a processor; and a storage device storing instructions that, when executed by the processor, cause the processor to perform a method, the method comprising: receiving, by an intermediate node, a packet that corresponds to a fragment of a content object message that is fragmented into a plurality of fragments, wherein one or more fragments of the plurality of fragments indicate a unique name, wherein the received fragment indicates an intermediate state which is based on a hash function performed on an intermediate state form a previous fragment and data included in the received fragment; and in response to determining that the received fragment is a first fragment: identifying a first entry in a pending interest table for an interest with a name that is based on a hash of a content object and that corresponds to the first fragment; and creating a second entry in the pending interest table based on a digest or a segment identifier for the content object message.

In another aspect, a computer-implemented method for forwarding packets is provided, comprising: receiving, by an intermediate node, a packet that corresponds to a fragment of a content object message that is fragmented into a plurality of fragments, wherein one or more fragments of the plurality of fragments indicates a unique name, wherein the received fragment indicates an intermediate state which is based on a hash function performed on an intermediate state from a previous fragment and data included in the received fragment; and in response to determining that the received fragment is a first fragment: identifying a first entry in a pending interest table for an interest with a name that is based on a hash of a content object and that corresponds to the first fragment; and creating a second entry in the pending interest table based on a digest or a segment identifier for the content object message.

In yet another aspect, non-transitory computer readable media encoded with instructions are provided. The instructions, when executed by a processor, cause the processor to perform a method of: receiving, by an intermediate node, a packet that corresponds to a fragment of a content object message that is fragmented into a plurality of fragments, wherein one or more fragments of the plurality of fragments indicate a unique name, wherein the received fragment indicates an intermediate state which is based on a hash function performed on an intermediate state form a previous fragment and data included in the received fragment; and in response to determining that the received fragment is a first fragment: identifying a first entry in a pending interest table for an interest with a name that is based on a hash of a content object and that corresponds to the first fragment; and creating a second entry in the pending interest table based on a digest or a segment identifier for the content object message.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating forwarding of packets, the computer system comprising:
   a processor; and
   a storage device storing instructions that, when executed by the processor, cause the processor to perform a method, the method comprising:
   receiving, by an intermediate node, a packet that corresponds to a received fragment of a content object message that is fragmented into a plurality of fragments,
   wherein one or more fragments of the plurality of fragments indicate a unique name,
   wherein the received fragment indicates an intermediate state which is based on a hash function performed on an intermediate state form a previous fragment and data included in the received fragment;
   in response to determining that the received fragment is a first fragment:
   identifying a first entry in a pending interest table for an interest with a name that is based on a hash of a content object and that corresponds to the first fragment, and removing the first entry from the pending interest table; and creating a second entry in the pending interest table based on a digest or a segment identifier for the content object message; and in response to determining that the received fragment is a subsequent fragment, identifying an entry in the pending interest table for an interest with a digest or a segment identifier that corresponds to the subsequent fragment.

2. The computer system of claim 1, wherein a name for the received fragment indicates the intermediate state and a number indicating a byte offset that corresponds to a starting byte for the received fragment.

3. The computer system of claim 1, wherein a name for the received fragment indicates a digest or a segment identifier for the content object message.

4. The computer system of claim 1, wherein the first fragment indicates a digital signature of a producer of the content object message.

5. The computer system of claim 1, wherein the first fragment includes no payload or a payload with a size smaller than a predetermined threshold that does not require re-fragmentation.

6. The computer system of claim 1, wherein the received fragment indicates a segment identifier that is indicated in the other fragments of the content object message and identifies the received fragment and other fragments of the plurality of fragments as corresponding to the content object message.

7. The computer system of claim 6, wherein the received fragment is a final fragment of the content object message and includes a digital signature of a producer of the content object message, wherein the digital signature creates a relationship between the segment identifier and a digest for the content object message.

8. The computer system of claim 1 wherein the first fragment includes an overall length for the content object message, wherein a corresponding entry in the pending interest table includes the overall length and a total number of bytes forwarded, and wherein the method further comprises:
in response to determining that the received fragment corresponds to an entry in the pending interest table, updating the total number of bytes forwarded based on a length and a position for the received fragment; and
in response to determining that the total number of bytes forwarded is equal to the overall length, removing the corresponding entry from the pending interest table.

9. A computer-implemented method for forwarding packets, the method comprising:
receiving, by an intermediate node, a packet that corresponds to a received fragment of a content object message that is fragmented into a plurality of fragments,
wherein one or more fragments of the plurality of fragments indicates a unique name,
wherein the received fragment indicates an intermediate state which is based on a hash function performed on an intermediate state from a previous fragment and data included in the received fragment;
in response to determining that the received fragment is a first fragment:
identifying a first entry in a pending interest table for an interest with a name that is based on a hash of a content object and that corresponds to the first fragment, and removing the first entry from the pending interest table; and
creating a second entry in the pending interest table based on a digest or a segment identifier for the content object message; and
in response to determining that the received fragment is a subsequent fragment, identifying an entry in the pending interest table for an interest with a digest or a segment identifier that corresponds to the subsequent fragment.

10. The method of claim 9, wherein a name for the received fragment indicates the intermediate state and a number indicating a byte offset that corresponds to a starting byte for the received fragment.

11. The method of claim 9, wherein a name for the received fragment indicates a digest or a segment identifier for the content object message.

12. The method of claim 9, wherein the first fragment indicates a digital signature of a producer of the content object message.

13. The method of claim 9, wherein the first fragment includes an overall length for the content object message, and wherein a corresponding entry in the pending interest table includes the overall length and a total number of bytes forwarded, the method further comprising:
in response to determining that the received fragment corresponds to an entry in the pending interest table, updating the total number of bytes forwarded based on a length and a position for the received fragment; and
in response to determining that the total number of bytes forwarded is equal to the overall length, removing the corresponding entry from the pending interest table.

14. Non-transitory computer readable media encoded with instructions that, when executed by a processor, cause the processor to perform:
receiving, by an intermediate node, a packet that corresponds to a received fragment of a content object message that is fragmented into a plurality of fragments,
wherein one or more fragments of the plurality of fragments indicate a unique name,
wherein the received fragment indicates an intermediate state which is based on a hash function performed on an intermediate state form a previous fragment and data included in the received fragment;
in response to determining that the received fragment is a first fragment:
identifying a first entry in a pending interest table for an interest with a name that is based on a hash of a content object and that corresponds to the first fragment, and removing the first entry from the pending interest table; and
creating a second entry in the pending interest table based on a digest or a segment identifier for the content object message; and
in response to determining that the received fragment is a subsequent fragment, identifying an entry in the pending interest table for an interest with a digest or a segment identifier that corresponds to the subsequent fragment.

15. The non-transitory computer readable media of claim 14, wherein a name for the received fragment indicates the intermediate state and a number indicating a byte offset that corresponds to a starting byte for the received fragment.

16. The non-transitory computer readable media of claim 14, wherein a name for the received fragment indicates a digest or a segment identifier for the content object message.

17. The non-transitory computer readable media of claim 14, wherein the first fragment includes an overall length for the content object message, wherein a corresponding entry in the pending interest table includes the overall length and a total number of bytes forwarded, and further comprising instructions to cause the processor to perform:
- in response to determining that the received fragment corresponds to an entry in the pending interest table, updating the total number of bytes forwarded based on a length and a position for the received fragment; and
- in response to determining that the total number of bytes forwarded is equal to the overall length, removing the corresponding entry from the pending interest table.

18. The non-transitory computer readable media of claim 14, wherein the first fragment includes no payload or a payload with a size smaller than a predetermined threshold that does not require re-fragmentation.

19. The non-transitory computer readable media of claim 14, wherein the received fragment indicates a segment identifier that is indicated in the other fragments of the content object message and identifies the received fragment and the other fragments of the plurality of fragments as corresponding to the content object message.

20. The non-transitory computer readable media of claim 19, wherein the received fragment is a final fragment of the content object message and includes a digital signature of a producer of the content object message, wherein the digital signature creates a relationship between the segment identifier and a digest for the content object message.

* * * * *